J. A. DE CEW.
PROCESS OF MAKING LUBRICATING COMPOSITION.
APPLICATION FILED OCT. 9, 1917.
1,336,207. Patented Apr. 6, 1920.
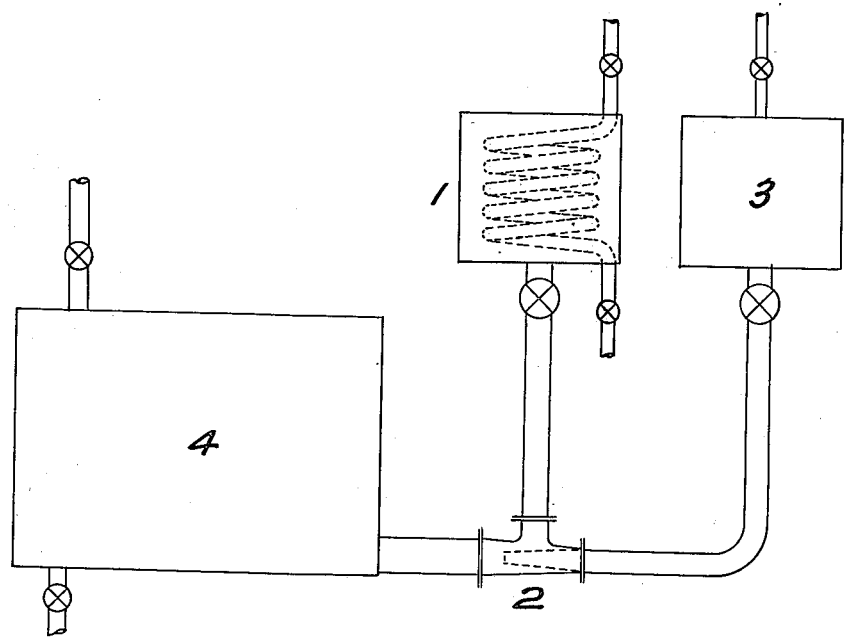
Inventor
Judson A. DeCew
By Fetherstonhaugh & Co
Attys.

UNITED STATES PATENT OFFICE.

JUDSON A. DE CEW, OF MONTREAL, QUEBEC, CANADA.

PROCESS OF MAKING LUBRICATING COMPOSITION.

1,336,207.     Specification of Letters Patent.     Patented Apr. 6, 1920.

Application filed October 9, 1917. Serial No. 195,607.

*To all whom it may concern:*

Be it known that I, JUDSON A. DE CEW, a subject of the King of Great Britain, and resident of the city of Montreal, in the province of Quebec and Dominion of Canada, have invented certain new and useful Improvements in Processes of Making Lubricating Composition, of which the following is a full, clear, and exact description.

This invention relates to aqueous solutions of oils, and a method of producing same, using sulfonated oils as the medium or solvent.

The main object of the invention is to produce dilute solutions containing a water insoluble oil dissolved in a dilute solution of a water soluble oil, or to produce a dilute aqueous solution of an oil which is but slightly water soluble.

For instance, I can produce a dilute solution of a sulfonated corn oil, which is but partially soluble in water, and in ordinary practice, always decomposes into emulsions and globules on the addition of an excess of water. The Turkey red oil of commerce is a sulfonated castor oil soluble in water. Other vegetable or animal oils, when sulfonated, are only partially soluble in water, and on dilution form unstable emulsions. They, therefore, can combine with only a small quantity of water before the composition breaks up, throwing the oil out of solution. If a Turkey red oil is blended with oils that are insoluble in water, it may act as a solvent for these oils and might take up a small amount of water before losing this solvent action. If, however, dilute solutions are made by mixing it with water by any ordinary means, then the insoluble oils are thrown out of solution and form globules, drops or coarse emulsions with the diluted water soluble oil. The water insoluble oils referred to may be any mineral, vegetable or animal oil or the fatty acids of same, such as oleic acid. In the first step of my process, which consists in dissolving a mineral or vegetable oil or mixture of same in a sulfonated oil, it is essential that the oils should be perfectly blended, so that the most intimate combination is obtained. The amount of oil which may be dissolved varies with the character of the oil used. The next step in the process is to dilute those mixtures with water to form an aqueous solution without disturbing the state of equilibrium between the oil and the solvent. The resulting product is not an emulsion consisting of particles of oil in an aqueous solution, but a more homogeneous composition in which the oil remains in a state of solution in the material that was obtained when they were mixed in a concentrated state. The lubricating qualities of this mixture are very much greater than any emulsion consisting of globules of oil floating in suspension. The oil in the composition actually exists in either true or colloidal solution, and only occasionally a small quantity of it may exist in the form of a very fine emulsion, it being desirable to have as little in the emulsified form as possible. This product is stable under ordinary temperatures for a sufficient length of time for all practical purposes.

The method which I employ in diluting a concentrated material to obtain the solutions above described is illustrated in U. S. Reissue Patent No. 12,549, dated October 23rd, 1906. Any similar apparatus, however, may be employed, such for instance as that diagrammatically illustrated in the drawing accompanying this specification. The tank, designated 1, containing the mixture of oil and solvent is heated by any suitable means, and the mixture is passed through any suitable injecting device 2, through which hot water is forced under pressure from the tank or reservoir 3. The mixture is instantly dissolved in the hot water, with which it comes in contact, and before any separation can take place between the oil and its solvent, it is blown directly into the cold water in the tank 4. The material is thus carried in two stages of dilution into a stable solution in which the tendency towards decomposition is very slight. In the operation of the diluting system, I prefer to use about four gallons of the mixture of the oil and its solvent with approximately twenty gallons of hot water and about two hundred and thirty gallons of cold water. The composition which I prefer to use when blending the oils with the sulfonated oil consists approximately of fifteen or more parts of say Turkey-red oil and eighty-five or less parts of water insoluble oils or fatty acids. In using other sulfonated oils, the amount of water insoluble oil which may be incorporated will depend upon the water soluble properties of the sulfonated oil.

Having thus described my invention, what I claim is:—

1. A method of making stable emulsions from blended water soluble and water insoluble oils with a minimum of the water soluble product which consists in bringing the oils in contact in a fine stream with hot water under pressure and forcing this solution into cold water by means of pressure.

2. A method of producing finer and more efficient emulsions from blended water soluble and water insoluble oils which consist in discharging the oil mixtures under pressure into hot water and then discharging it immediately into cold water.

3. A method of reducing the amount of sulfonated oil necessary to emulsify a water insoluble oil which consists in diluting a blended mixture of sulfonated oil and water insoluble oil rapidly with hot water by means of pressure applied to the material, and then chilling the hot emulsion before separation can take place by forcing it immediately into cold water.

4. A method of diluting a water-insoluble oil, which comprises rapidly mixing a liquid containing water-soluble oil and water-insoluble oil, with a forcible current of hot aqueous liquid, and quickly introducing the so formed mixture into a cold aqueous liquid, whereby a stable product is produced.

In witness whereof, I have hereunto set my hand.

JUDSON A. DE CEW